United States Patent [19]

McMahan, Sr.

[11] 4,076,346
[45] Feb. 28, 1978

[54] FACE-TO-FACE PLATE-TYPE SWIVEL

[75] Inventor: Roy F. McMahan, Sr., Louisville, Ky.

[73] Assignees: Roy F. McMahan, Jr.; William L. McMahan, both of Louisville, Ky.

[21] Appl. No.: 729,902

[22] Filed: Oct. 6, 1976

[51] Int. Cl.² .................. B60B 33/00; F16C 17/00
[52] U.S. Cl. ................... 308/237 R; 16/20; 248/425; 403/164
[58] Field of Search .......... 308/235, 251 R, 237 R, 308/238; 16/20; 403/164, 165; 248/415, 425

[56] References Cited

U.S. PATENT DOCUMENTS

| | | | |
|---|---|---|---|
| 1,859,352 | 5/1932 | Albee | 308/235 |
| 2,592,811 | 4/1952 | Lebensfeld | 308/235 |
| 3,231,301 | 1/1966 | Gray | 403/164 |
| 3,837,039 | 9/1974 | Rehrig | 16/20 |

*Primary Examiner*—Richard A. Bertsch
*Attorney, Agent, or Firm*—Arthur F. Robert

[57] ABSTRACT

A pair of relatively rotatable face-to-face metal swivel plates centrally secured together adjacent the common center axis and arranged along their respective margins for respective securement to an article and the base. A continuous circular V-shaped bearing race is formed in one metal plate to extend concentrically about the center axis and spaced a substantial distance therefrom. A frictionless plastic bearing material is not only interposed between the metal plates with its opposite sides engaging opposite plates for bearing and spacing purposes but is also curved arcuately to conform to the circular curvature of the race. One side of that material is V-shaped to extend into and conform to the V-shape of said race sufficiently along the length of the race for centering one plate. The opposite side of that same material and the other metal plate mutually cooperate to provide complementary centering means.

7 Claims, 11 Drawing Figures

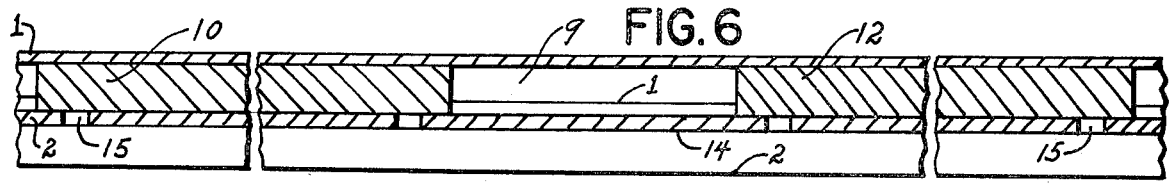
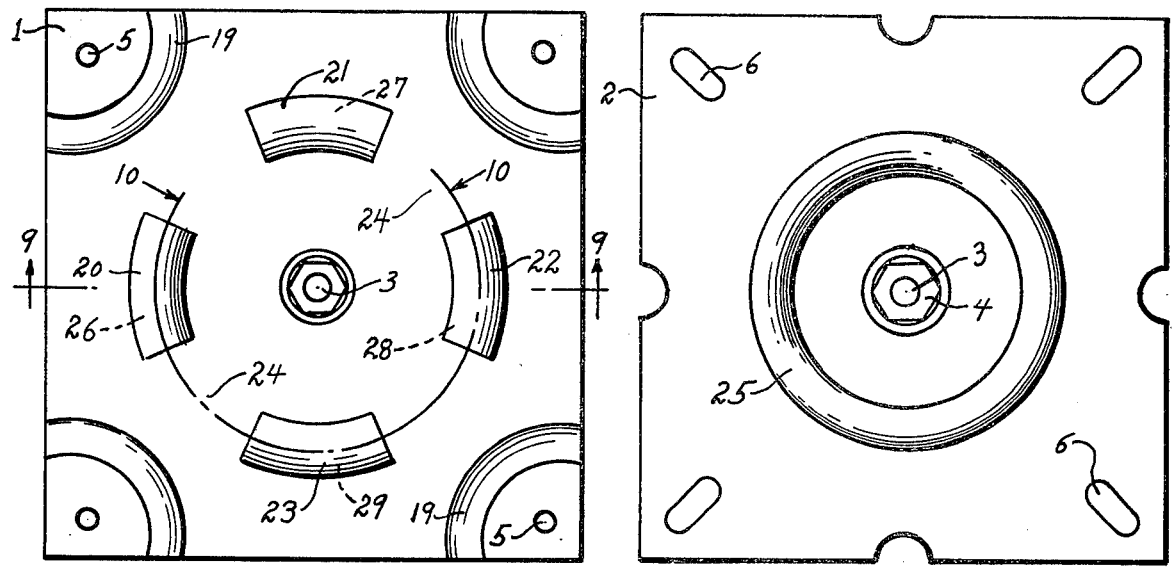
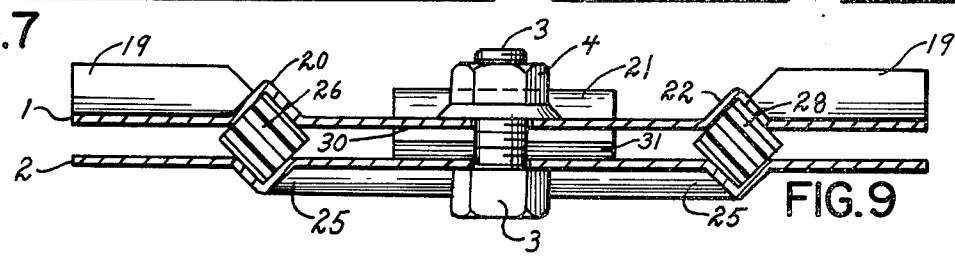
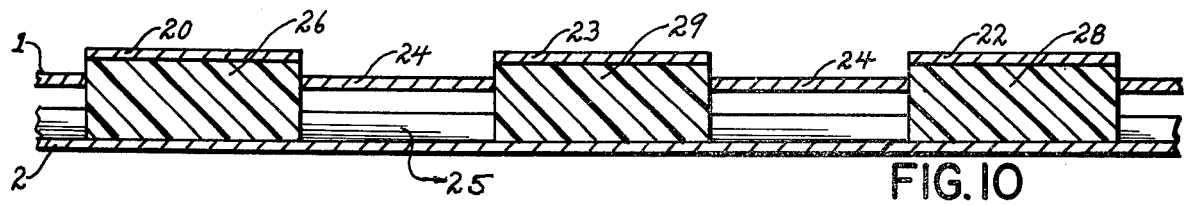
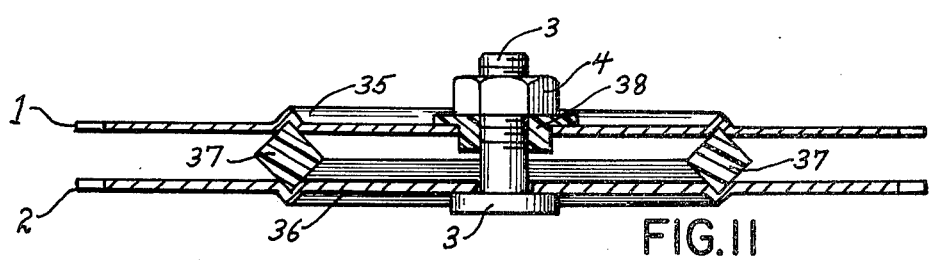

FACE-TO-FACE PLATE-TYPE SWIVEL

CROSS REFERENCES TO RELATED APPLICATIONS

A related application has not been filed.

BACKGROUND OF THE INVENTION

1. Field Of The Invention

This invention relates to face-to-face plate-type swivels which are widely used for supporting an article rotationally upon a base, viz: a chair seat upon a chair base, a television set upon its base, etc.

2. Description Of The Prior Art

It has been customary for many years past to employ centrally securable upper and lower swivel plates spaced by an interposed circular series of spaced ball bearings arranged in complementary circular grooves or races.

The LeBlanc U.S. Pat. No. 3,120,982 notes the objections, deficiencies and limitations of ball bearing swivels and proposes to provide a noiseless, greaseless, durable and inexpensive swivel joint by mounting a Nylon ring permanently in each race to provide Nylon-to-Nylon bearing contact between plates.

Other patents, which replace ball bearings with frictionless plastic material are the Niemi and Faull U.S. Pat. Nos. 3,445,147 and 3,574,427. They identically disclose a pair of circular "frictionless" plastic rings arranged one upon the other between centrally securable upper and lower swivel plates to facilitate the rotation of one plate relative to the other and stop means preventing relative movement between each ring and its adjacent plate upon relative rotary movement between the plates.

In all three of the foregoing patents, one rotary plate and the adjacent plastic ring rotate as a unit relative to the other plate and its adjacent ring. Also all plates are centered by centering means extending along the axis of rotation.

SUMMARY OF THE INVENTION

Objects Of The Invention

The principal object of the present invention is to produce a face-to-face plate-type swivel with an interposed frictionless bearing material at lower cost without any corresponding loss in simplicity of design, ease of assembly or strength of structure and to improve the ease of operation and ease of maintenance. More particularly, it is an object of the present invention to provide a face-to-face plate-type swivel with an interposed frictionless bearing material which functions to center the swivel plates and to decrease the resistance to rotation of the rotary plate.

Statement Of The Invention

The objects of my invention are achieved in a face-to-face plate-type swivel for rotationally supporting an article upon a base, comprising: a pair of relatively rotatable face-to-face metal swivel plates centrally secured together and arranged for respective securement to an article and a base; and plate-bearing means for axially spacing said article and base plates from each other and for axially aligning them relative to each other and centering them for relative rotation about a center axis common to both, said plate-bearing means being radially spaced a substantial distance from said common axis, said radially spaced plate-bearing means including a continuous circular V-shaped race formed in one metal plate to extend concentrically about said common axis and radially spaced a substantial distance therefrom, and frictionless plastic bearing material not only interposed between said metal article and base plates with its opposite sides engaging opposite plates for bearing and spacing purposes but, for said axial aligning and centering purposes, also curved to conform to the circular curvature of said V-shaped race in said one plate, one side of said material also being V-shaped to project into and conform to the V-shape of said race and extending sufficiently along the length of the race circle for axially aligning said bearing material and said one plate relative to each other and to said common axis, the opposite side of said material and said other metal plate mutually cooperating to provide complementary means for axially aligning said bearing material and said other plate relative to each other and to said common axis.

BRIEF DESCRIPTION OF THE DRAWINGS

The invention is illustrated in the accompanying drawings wherein:

FIGS. 1–6 are views of a 1st swivel plate embodying the invention,

FIGS. 1 and 2 being top and bottom plan views thereof which omit the center bolt and nut, FIG. 3 an edge elevational view as seen when looking at the bottom edges of FIG. 1, FIGS. 4 and 5 sectional views taken on lines 4—4 and 5—5 respectively of FIG. 1, and FIG. 6 a developed section taken along lines 6—6 of FIG. 1;

FIGS. 7–10 are views of a 2nd swivel plate embodying the invention,

FIG. 7 being a top plan view thereof,

FIG. 8 a bottom plan view,

FIG. 9 a section taken on lines 9—9 of FIG. 7 and

FIG. 10 is a developed sectional view taken along lines 10—10 of FIG. 7 but omitting the centrally disposed axial nut; and FIG. 11 is a central sectional view of a 3rd swivel plate embodying the invention, this view being similar in nature to the sectional FIG. 4 view of the 1st swivel and the sectional FIG. 8 view of the 2nd swivel.

DESCRIPTION OF THE PREFERRED EMBODIMENT

Figure 1:
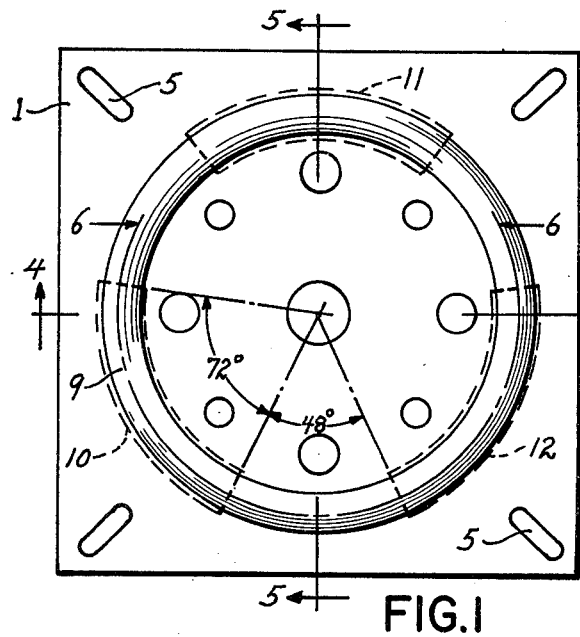
Figure 2:
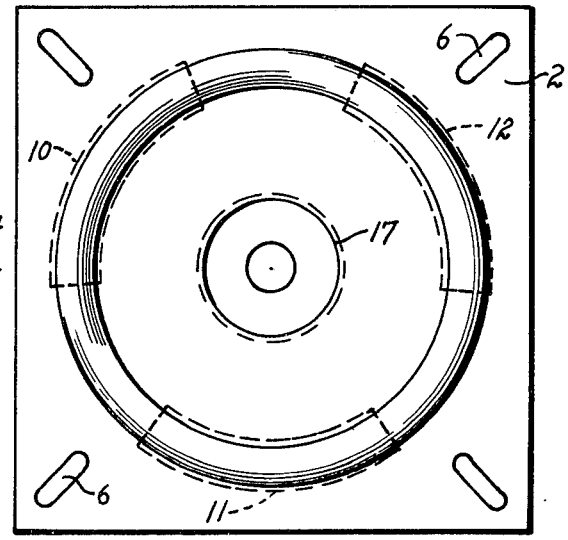
Figure 3:
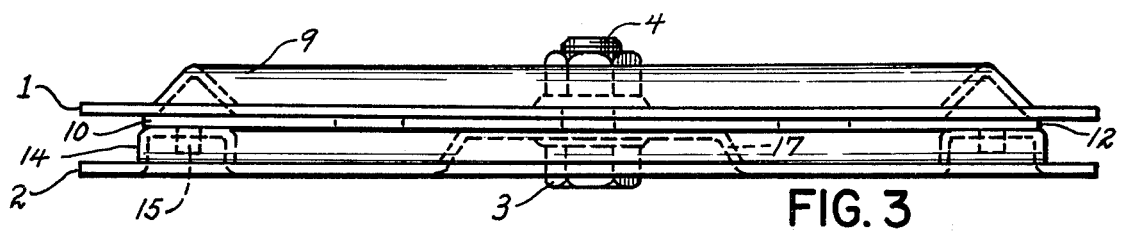

All three illustrated plate-type swivels for rotationally supporting an article on a base broadly comprise: a pair of plates and plate spacing and centering means.

1st Embodiment — FIGS. 1–6

In the 1st embodiment of FIGS. 1–6, a pair of relatively rotatable face-to-face rectangular metal swivel plates 1 and 2 are centrally secured together adjacent a common center axis by a bolt 3 and nut 4. The plate 1 is arranged along its margin adjacent each corner with openings 5 to facilitate its securement to one part, say, the article. The plate 2 is similarly arranged with holes 6 for base securement purposes.

The means for spacing the plates 1 and 2 and for centering them for relative rotation about the common center axis includes broadly a bearing race in one plate, a bearing material between plates and supplementary means on the other plate. Thus, a continuous circular V-shaped bearing race 9 is formed in metal plate 1 to extend concentrically about the center axis. This race is spaced a substantial distance from the center axis, preferably extending closer to the perimeter of the plate than it does to the center thereof.

The bearing material is not only interposed between the metal plates with its opposite sides engaging opposite plates for bearing and spacing purposes but it is also curved arcuately to conform to the circular curvature of the race 9. As illustrated, this bearing material is composed of a frictionless plastic material provided in three segments 10, 11 and 12, each extending through an angle of about 72° with a 48° spacing between adjacent bearing segments. Naturally, the bearing segment spacing and the number of bearing segments may be varied as desired.

Figure 4:
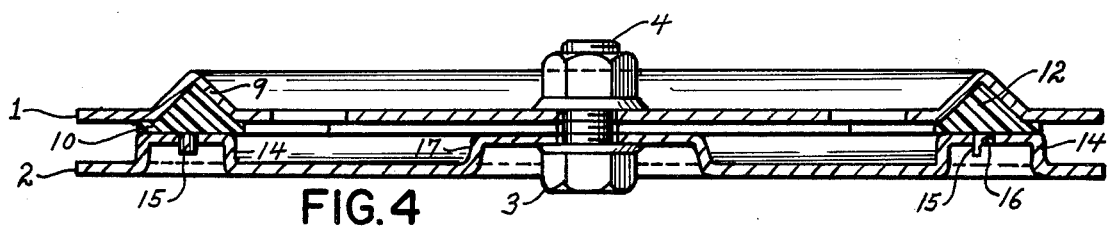
Figure 5:
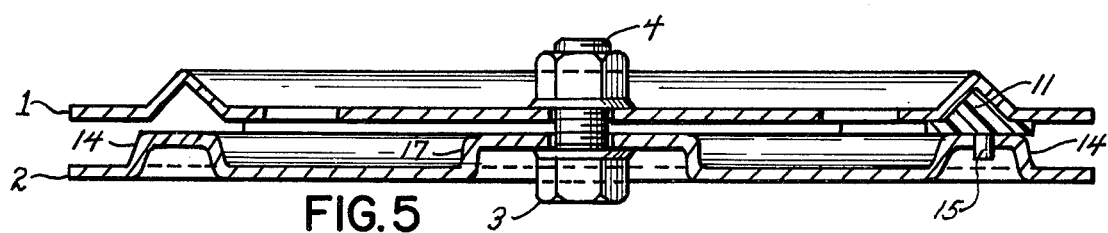

One side of each bearing segment is V-shaped, as can be readily seen in FIGS. 4 and 5 wherein it appears as an inverted Vee. The V-shaped side of each bearing segment extends into, frictionally engages, and conforms to the V-shape of the race 9. The length of each bearing segment should be sufficient for stable plate-centering purposes. The 72° angular length of each of the three symmetrically spaced bearing segments is amply sufficient for centering plate 1.

The opposite side of each bearing segment and the other metal plate 2 mutually cooperate to provide complementary bearing segment holding and plate-centering means. Accordingly, the opposite side of each bearing segment is flat-faced to fit flushly against the flat top of the raised circular trough 14 of inverted U-shape formed in plate 2 while each bearing segment is stationarily secured to the trough by a suitable number of pin and pin-receiving hole connections. Preferably, each bearing segment is provided with securing pins 15 while the circular trough 14 is provided with pin-receiving holes 16. While, as seen in FIG. 6, two pins 15 for each bearing segment should normally be sufficient, more may be provided as desired. A raised center boss 17 is conventionally provided in the central area of the plate 2.

In the normal operation of the foregoing structure, the pin and pin-hole connections 15, 16 mutually cooperate to hold the segments and plate 2 in centered relationship to the center axis of the swivel, while the V-shaped side of the segments 10–12 and the V-shaped race 9 mutually cooperate to center plate 1 about the center axis of the swivel. Plate 1 rotates about that axis and, in doing so, has rubbing contact only with the V-shaped side of the bearing segments 10–12 which cooperate to provide a noiseless, greaseless, durable and inexpensive bearing preferably composed of Nylon although it may be composed of any other suitable frictionless plastic bearing material.

With more and more use, this rubbing action of the metal surface of plate 1 against the Nylon segments will render the rubbed inverted Vee surface of each segment smoother and less resistant to rotation without, at the same time, subjecting that surface to appreciable wear or causing it to roughen or gall; hence, the bearing segments provide a clean bearing of long life which is not readily affected by other conditions such as the presence of atmospheric dust and which does not create dirt or dust. It will thus be appreciated that I have produced a face-to-face plate-type swivel with an interposed frictionless bearing material at lower cost without any corresponding loss in simplicity of design, ease of assembly or strength of structure. The metal to Nylon rubbing surface improves the ease of operation over the Nylon-to-Nylon contacts of the prior art swivels and reduces maintenance. Furthermore, the swivel is a self-centering one because the V-shape of the race and the adjacent side of the bearing segments provide a centering means while the pins and pin-receiving holes on the other side of the bearing segments mutually cooperate to provide complementary centering means. As a consequence, the bolt and nut connection 3, 4 need not necessarily be constructed and secured to provide a close-fitting centering means.

Second Embodiment — FIGS. 7–10

This embodiment, which functionally is the same as the 1st embodiment, is structurally the same as the 1st embodiment in parts and part numbers except: that the corner openings 5 in plate 1 are circular, a raised corner boss 19 curves 90° about each circular opening 5, and the bearing race is a discontinuous circular bearing race containing four 45° long race segments 20, 21, 22 and 23 of inverted V-shape, which are separated by 45° long flats designated 24; plate 2 has a continuous circular V-shaped bearing race 25; the frictionless bearing material between plates is in the form of four 45° long square-shaped Nylon segments 26, 27, 28 and 29, which are arranged between the plates like a diamond having four equal sides providing an inverted V-shaped top side for the race segments in plate 1 and a verted V-shaped bottom side for the circular race 25 in plate 2; and a pair of centrally-disposed spacers, in the form of washers, are provided, comprising a top Nylon washer 30 adjacent the rotary plate 1 and a bottom metal washer 31 adjacent the stationary plate 2.

In operation, the 45° bearing segments 26–29 are stationary relative to plate 1 since they are held by the flats 24 of plate 1 at the ends of the race segments 20–23. However, as plate 1 revolves, it carries these bearing segments with it; hence, they rub the V-shaped surface of the circular V-shaped bearing race 25 of the lower plate 1.

As will be obvious, embodiments 1 and 2 are basically the same. They essentially have the same spacing and self-centering features, operate in the same or equivalent way and enjoy substantially the same advantageous results.

Third Embodiment — FIG. 11

The 1st two embodiments are characterized by a circular race in one plate, a segmental race in the other plate and segmental bearing material. This 3rd embodiment is characterized by circular races 35 and 36 in plates 1 and 2 and a circular frictionless plastic bearing ring 37 interposed therebetween. The bearing material may be in the form of either a continuous ring 37 or a straight strand of bearing material having a square cross-section and a length equivalent to the length of the circular races 35, 36. It is arranged in diamond fashion so that its inverted Vee top side fits into the inverted V-shaped race 35 while its verted Vee bottom side fits into the verted V-shaped race 36 of the bottom plate 2. Additionally, the bolt 3 is provided with a Nylon bushing 38 which separates the stem of the bolt from the surrounding edge of the center opening in plate 1 and thus prevents any metal-to-metal contact between plate 1 and the stem of bolt 3.

Structurally, the 3rd embodiment of FIG. 11 is simpler than the 1st two embodiments. Functionally, it is basically the same except that the bearing material 37 is not anchored to either plate 1 or 2 although it may normally be expected to remain stationary in use. The bearing material 37 performs the same spacing and self-centering functions, and operates in the same or equivalent way and obtains substantially the same results.

Having described my invention, I claim:

1. A plate-type swivel for rotationally supporting an article upon a base, comprising:
   A. a pair of relatively rotatable face-to-face metal swivel plates centrally secured together and arranged for respective securement to the article and the base; and
   B. plate-bearing means for axially spacing said article and base plates from each other and for axially aligning them relative to each other and centering them for relative rotation about a center axis common to both.
      1. said plate-bearing means being radially spaced a substantial distance from said common axis.
      2. said radially spaced plate-bearing means including
         a. a continuous circular V-shaped race formed in one metal plate to extend concentrically about said common axis and radially spaced a substantial distance therefrom, and
         b. frictionless plastic bearing material not only interposed between said metal swivel plates with its opposite sides engaging opposite plates for bearing and spacing purposes but, for said axial aligning and centering purposes, also curved to conform to the circular curvature of said V-shaped race in said one metal plate,
            i. one side of said material also being V-shaped to project into and conform to the V-shape of said race and extending sufficiently along the length of the race circle for axially aligning said bearing material and one metal plate relative to each other and for centering them about said common axis.
            ii. the opposite side of said material and said other metal plate mutually cooperating to provide complementary means for axially aligning said bearing material and said other plate relative to each other and for centering them about said common axis.

2. The swivel of claim 1 wherein:
   A. said frictionless plastic bearing material is composed of a series of spaced curved segments V-shaped on one side and flat-faced on the opposite side.

3. The swivel of claim 2 wherein:
   A. said complementary centering means for each segment part and the corresponding plate part comprises a pin on one part and a pin-receiving opening on the opposite part.

4. The swivel of claim 1 wherein:
   A. said frictionless plastic bearing material is composed of a series of spaced curved 4-sided segments,
      1. each segment bearing arranged to present a V-shape to each plate; and
   B. the other plate has a corresponding series of spaced curved V-shaped race segments to receive the corresponding V-shape of said plastic segments,
      1. said other plate presenting, at the opposite ends of the race segment, stops which restrict endwise movement of the plastic segments relative to their race segments.

5. The swivel of claim 4 wherein:
   A. the segmented race and the plastic segments are on the movable article plate.

6. The swivel of claim 4 wherein:
   A. the base plate is stationary; and
   B. the race and plastic segments are on the stationary base plate.

7. The swivel of claim 1 wherein:
   A. both races are continuous, circular and V-shaped in cross-section; and
   B. said frictionless plastic bearing material is 4-sided and arranged to present a V-shape to each plate.

* * * * *